UNITED STATES PATENT OFFICE.

GEORGE WILLIAMS, OF WINNIPEG, CANADA.

PROCESS OF MANUFACTURING CEMENT.

SPECIFICATION forming part of Letters Patent No. 449,510, dated March 31, 1891.

Application filed November 13, 1890. Serial No. 371,348. (No specimens.)

*To all whom it may concern:*

Be it known that I, GEORGE WILLIAMS, a subject of Her Majesty Victoria, Queen of Great Britain and Ireland and Empress of India, residing at No. 215 Alexander Street, city of Winnipeg, county of Selkirk, Province of Manitoba, Dominion of Canada, have invented certain new and useful Improvements in the Process of Manufacturing Cement; and I do hereby declare that the following is a full, clear, and exact description of the process, which will enable others skilled in the art to which it appertains to make and use the same.

Heretofore cement has been manufactured from a composition of materials containing carbonate of lime and alumina brought together by the use of water only, and which are similar to those used by my process; but the object of my invention is to reduce the moisture as used in the old process by a solution composed of silicate of soda and water, acting on the materials by steam and immersion, which produces a more accurate combination of the ingredients, and by adding thereto a thin paste of chloride of calcium, unslaked lime, and warm water with the carbonate of lime and pulverized clay or other substances containing alumina and silex, so as to produce a chemical reaction throughout the whole mass. It also reduces the heating power required in drying and burning. It also enhances the cement produced, both in quality and duration, and also enables me to produce hydraulic cement from any limestone and alumina.

The process is as follows: Take carbonate of lime or any other substance from which lime is obtained, which on being reduced to fragments of about four-inch cubes, being calcined in a kiln to a bright red heat, slake or fall to pieces from exposure to the air or from being brought in contact with water. Then put the material into a suitable steam-tight tank, into which steam is admitted at a pressure of not less than twenty pounds to the square inch, produced in a boiler from a solution composed of one part of silicate of soda and one hundred parts of water, to be increased or diminished by silicate of soda as the hardness or softness of the material may require, the quantities here given being ordinarily sufficient, letting it remain in the tank a sufficient length of time until the steam acting on the material reduces it to a powder and brings the whole mass to a more even degree of tenacity; but should the carbonate of lime be used in its natural state without being calcined, being only pulverized, then immerse the same in a suitable steam-tight tank containing a boiling solution composed of one part of silicate of soda and one hundred parts of water, to be increased or diminished by silicate of soda as the hardness or the softness of the material may require, the quantities here given being ordinarily sufficient, letting it remain in the tank until it becomes saturated, which brings the whole mass to a more even degree of tenacity, the action of the boiling solution of silicate of soda and water on the pulverized carbonate of lime being similar to that produced by the steam. The action of the steam produced from silicate of soda and water for the steam process and that of the boiling solution of silicate of soda and water for the immersion process prevents the carbonate of lime from being oversaturated, and also combines to a greater degree with the same and improves its hydraulic and insoluble properties; but steam produced from water alone produces a powder of a moist nature without the hydraulic and binding properties of that produced by silicate of soda and water.

The boiler in which steam is produced from the silicate of soda and water and used for the steam process, also for the boiling solution produced from silicate of soda and water for the immersion process, to be specially set apart for those purposes, heated in the usual way by wood or coal, the upper portion of boiler having pipes to convey steam from boiler to tank for the steam process and the lower portion of boiler to convey boiling solution for the immersion process, both of these pipes being properly connected to boiler and tanks in proper positions. At this stage of the process the materials are in a condition to be taken to the mixing-machine to be incorporated with pulverized clay or other substances containing alumina and silex, and during the process of mixing those substances together add a thin paste composed of chloride of calcium one part, unslaked lime ten parts, and warm water one hundred and fiftysix parts, so that the whole will be thoroughly saturated, incorporated, and brought to a plastic consistency, the silicate of soda and chloride of calcium producing a chemical reaction throughout the whole mass, the result of this being to bring it to a firmer consistency. After this it can be molded to any desired shape, and can then be readily handled, afterward taken to the kiln and dried by heat, so as to expel any moisture remaining, and then burned to a state of white heat by the use of coke laid in layers between the material, so as to produce a vitrified clinker, which, being taken to a pulverator and ground to as fine a condition as to produce hydraulic cement ready for use, the purposes for which it may be applied are the construction of dams, locks, piers, waterworks, foundations of all kinds, concrete cellar or other floors, foot-paths, external finishing of houses or other buildings, and with the admixture of other suitable materials all the purposes for which artificial stone is used, and generally for all purposes for which a hydraulic cement may be used.

What I claim as my invention, and desire to secure by Letters Patent of the United States of America, is—

The process of making hydraulic cement, which consists in reducing carbonate of lime to a powder by steam, under pressure, produced from a solution of silicate of soda and water in the proportions named, adding to the powder so produced alumina and silex and a thin paste of chloride of calcium, unslaked lime, and warm water, molding it into convenient forms, which are burned to a white heat, so as to produce a clinker, which is then ground to a fine condition, all substantially as described.

GEORGE WILLIAMS.

Witnesses:
 WILLIAM DOUGHTY,
 WM. WELLBAND.